Patented Mar. 10, 1931

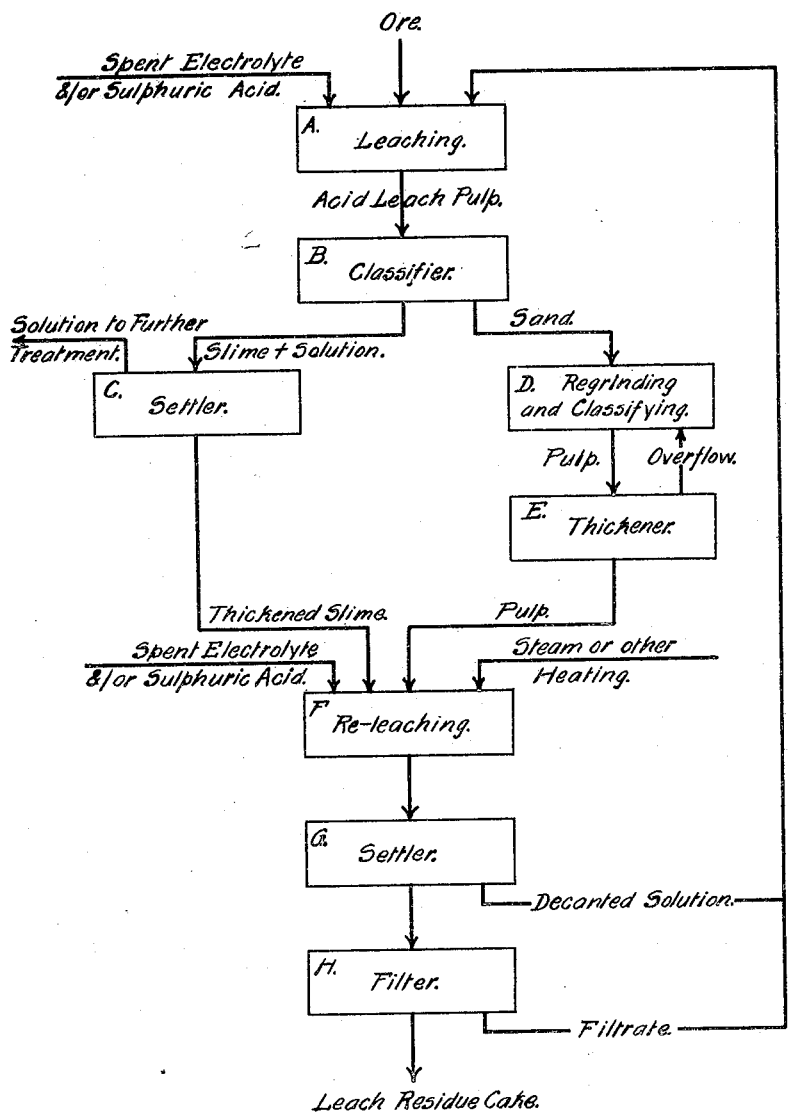

1,795,412

UNITED STATES PATENT OFFICE

ROYALE HILLMAN STEVENS, GERALD CHAD NORRIS, AND WILLIAM NELSON WATSON, OF BROKEN HILL, NORTHERN RHODESIA, ASSIGNORS TO RHODESIA BROKEN HILL DEVELOPMENT COMPANY LIMITED, OF BROKEN HILL, NORTHERN RHODESIA

ACID EXTRACTION OF METALS SUCH AS ZINC AND VANADIUM

Application filed September 24, 1926, Serial No. 137,619, and in Southern Rhodesia April 7, 1926.

In the acid leaching of ores it is usual to finish the leach with a low acid concentration in order to simplify the further treatment of the solution. In the case however of an ore containing two valuable metals, one of which, such as zinc or copper, is relatively easily soluble in a certain solvent acid and the other of which, such as vanadium, is relatively difficultly soluble in the same acid, so that it can only be dissolved by acid in a state of relatively high concentration, leaching conditions suitable for dissolving the more soluble metal and for finishing the leach with low acidity are not suitable for the extraction of the less soluble metal, for the reason that the leach liquor, as it becomes weaker towards the end of the leach, would cease to dissolve the more difficultly soluble metal.

The present invention provides a double acid leaching method whereby the extraction of both metals may be attained, together with low acidity in the greater part or all of the final leach solution.

According to this invention an ore containing two valuable metals, one of which is relatively easily soluble in a given solvent acid and the other of which is relatively difficultly soluble in the same solvent acid, is first so leached with said acid that the leach is finished with low excess acidity. The acid used in this step may be of any strength appropriate to ensure the extraction of the more soluble metal, in the course of which extraction and especially in the initial stages thereof there would usually be obtained a certain degree of extraction of the less soluble metal. This step is carried out at normal temperature, and the solution so obtained, after separation from the residue, is further treated as is necessary for the recovery of its valuable metals.

The residue from this first leaching step is again leached with the same solvent acid which in this case is kept throughout the leach at a concentration not less than that necessary to ensure the extraction of the portion of the less soluble metal which was insoluble under the conditions of the first leach.

The solid residue from the first leaching step is of less mass than the original ore owing to the removal, by solution of a proportion of the original ore by the first leaching liquor. Such residue will therefore usually bear the expense of special steps to promote the recovery of the less soluble metal, although such steps could not be economically applied to the whole mass of original ore. It is generally desirable, for instance, to conduct the second leach at an elevated temperature. In many cases also it is profitable to classify the residue from the first leach and regrind the sand product of the classification for the sake of the resulting increased recovery of metal in the second leach.

The solution resulting from the second leaching step is suitably treated with the view to recovering its dissolved metal values. It is conveniently dealt with by mixing it with the fresh acid solution to be employed in the first leaching step. In this way its excess acid is usefully employed to dissolve a further quantity of the more soluble metal and at the same time the solution is brought to a condition suitable for further treatment involving the addition of a base; whilst the metal or metals dissolved in the second leaching step are recovered in the subsequent treatment of the solution from the first leaching step.

The term "ore" is used in this specification to include oxide ore, roasted ore, roasted concentrate, tailing, slime, slag, and other metalliferous materials.

An ore containing zinc and/or copper, together with vanadium in sufficient quantity to warrant its recovery, may be treated according to this invention as follows, reference being made to the accompanying flow sheet.

The ore, suitably comminuted, is treated in step A with a solution of sulphuric acid which may be spent electrolyte from the electrolytic cells in which the zinc or copper is ultimately recovered.

This leaching step is finished at an acidity of from 2 to 5 grams free sulphuric acid per litre.

The resulting pulp is, in the case illustrated, classified in step B, the slime product being passed to settlers C and the sand product being re-ground and thickened in steps D and E. It will be observed that the amount of material which is thus re-ground is relatively small, consisting only of the sand fraction of the residue fraction of the original ore. The cost of regrinding it is therefore not considerable and is usually justified by the consequent increased extraction.

The re-ground sand product together with the slime product are then further leached in step F with sulphuric acid at an elevated temperature, conveniently about 50° C. The excess of free acid in the re-leach solution is maintained at not less than about 40 grams free sulphuric acid per litre and preferably about 50 grams.

Leaching for a period of about 3 hours under these conditions is usually sufficient to dissolve substantially all of the remaining vanadium. The acid solution and the leach residue are then separated in steps G and H; the leach residue being discarded or being treated for the recovery of other metal as the nature of the residue may govern.

The relatively high excess acidity of the solution from the re-leaching step is then neutralized, preferably by using the re-leach solution as leaching acid in the first leach step A.

We claim:

1. The process of treating ores containing vanadium and another metal more soluble in acid than vanadium which consists in leaching the ore with relatively low excess acidity in the leach solution, separating the residue from the leach solution, and re-leaching the residue with acid maintained at a concentration equivalent to not less than 40 grams free sulphuric acid per litre.

2. The process of treating ores containing vanadium and another metal more soluble in acid than vanadium which consists in leaching the ore with relatively low excess acidity in the leach solution, separating the residue from the leach solution, and re-leaching the residue at an elevated temperature with acid maintained at a concentration equivalent to not less than 40 grams free sulphuric acid per litre.

3. The process of treating ores containing vanadium and another metal more soluble in acid than vanadium, which consists in leaching the ore with relatively low excess acidity in the leach solution and thereby selectively leaching out the other metal, separating the residue from the leach solution, classifying the residue, re-grinding the sand constituent thereof and thereafter re-leaching the whole residue for the extraction of vanadium with acid maintained at a concentration equivalent to not less than 40 grams free sulphuric acid per litre.

4. The process of treating ores containing vanadium and another metal more soluble in acid than vanadium which consists in leaching the ore with relatively low excess acidity in the leach solution, separating the residue from the leach solution, separating the sand constituent of the residue, re-grinding such sand constituent, and re-leaching the whole residue at an elevated temperature with acid maintained at a concentration equivalent to not less than 40 grams free sulphuric acid per litre.

In testimony whereof we affix our signatures.

ROYALE HILLMAN STEVENS.
GERALD CHAD NORRIS.
WILLIAM NELSON WATSON.